United States Patent
Higuchi et al.

(10) Patent No.: US 8,036,761 B2
(45) Date of Patent: Oct. 11, 2011

(54) SIMULATION HARDWARE APPARATUS COMPRISING VEHICLE MODEL

(75) Inventors: Takashi Higuchi, Kobe (JP); Hirotoshi Tonou, Kobe (JP); Takeshi Yamazaki, Kobe (JP); Yu Moriyama, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 295 days.

(21) Appl. No.: 12/311,212

(22) PCT Filed: Sep. 27, 2007

(86) PCT No.: PCT/JP2007/068863
§ 371 (c)(1),
(2), (4) Date: Mar. 23, 2009

(87) PCT Pub. No.: WO2008/047555
PCT Pub. Date: Apr. 24, 2008

(65) Prior Publication Data
US 2009/0312850 A1 Dec. 17, 2009

(30) Foreign Application Priority Data
Sep. 27, 2006 (JP) ................................ 2006-263420

(51) Int. Cl.
*G05B 13/02* (2006.01)
*G06G 7/48* (2006.01)
(52) U.S. Cl. ............................................ 700/29; 703/8
(58) Field of Classification Search .................... 700/29, 700/97; 703/7, 8
See application file for complete search history.

(56) References Cited

U.S. PATENT DOCUMENTS

| 2002/0029136 A1* | 3/2002 | Hagiwara et al. | 703/8 |
|---|---|---|---|
| 2006/0069541 A1* | 3/2006 | Walacavage et al. | 703/22 |
| 2007/0118319 A1* | 5/2007 | Pillin et al. | 702/108 |
| 2007/0255482 A1* | 11/2007 | Fukuda | 701/99 |

FOREIGN PATENT DOCUMENTS

| JP | A 64-15861 | 1/1989 |
|---|---|---|
| JP | A 8-234826 | 9/1996 |
| JP | A 9-34346 | 2/1997 |
| JP | A 11-14507 | 1/1999 |
| JP | A 11-238042 | 8/1999 |
| JP | A 2000-163392 | 6/2000 |
| JP | A 2001-209407 | 8/2001 |
| JP | A 2002-328704 | 11/2002 |
| JP | A 2004-38785 | 2/2004 |
| JP | A 2004-361292 | 12/2004 |
| JP | A 2006-190131 | 7/2006 |
| WO | WO 2006073103 A1 * | 7/2006 |

* cited by examiner

Primary Examiner — Ryan Jarrett
(74) Attorney, Agent, or Firm — Oliff & Berridge, PLC

(57) ABSTRACT

A simulation apparatus is composed of an integrated plant model process unit 1, virtual ECUs 50A to 50C that simulate other controllers, and a simulation management unit 2 that manages the execution of an input and output process to a real ECU 300, a process by the integrated plant model process unit 1, and a process by the virtual ECUs 50A to 50C, and so on, and the simulation management unit 2 causes the integrated plant model process unit 1, the virtual ECUs 50A to 50C, and so on to execute the processes required for the operation of the real ECU 300 during a given period on the basis of the operation of the real ECU 300.

4 Claims, 7 Drawing Sheets

FIG. 7

| TIME | PROCESS CONTENTS |
|---|---|
| RT0 | START-UP OF SYSTEM MANAGER BY REAL-TIME MANAGER |
| t1 | CAUSE INPUT AND OUTPUT MANAGER TO ACQUIRE INPUT SIGNAL FROM REAL ECU |
| t2 | START-UP OF REAL ECU |
| t3 | INPUT SIGANL FROM INPUT AND OUTPUT MANAGER TO PLANT MODEL |
| t4 | OUTPUT PROCESS RESULT OF PLANT MODEL TO INPUT AND OUTPUT MANAGER |
| t5 | RECEIVE COMPLETION NOTIFICATION OF SIGNAL OUTPUT TO REAL ECU |
| t6 | RECEIVE PROCESS COMPLETION NOTIFICATION OF VIRTUAL ECU |
| t7 | NOTIFY REAL-TIME MANAGER OF COMPLETION OF PRESCRIBED SOFTWARE PROCESS |
| RT1 | START-UP OF SYSTEM MANAGER BY REAL-TIME MANAGER |

US 8,036,761 B2

SIMULATION HARDWARE APPARATUS COMPRISING VEHICLE MODEL

TECHNICAL FIELD

The present invention relates to a simulation apparatus used to the development of an electronic control unit for a vehicle, for example, as well as a model for simulation used to the simulation apparatus, and an apparatus forming the model for simulation.

BACKGROUND ART

In a vehicle, a lot of electronic control units (ECUs) controlling various controlled plants (controlled objects) such as an engine, a power steering, a brake, and a torque converter are installed.

In the development phase and the design phase of the ECUs as mentioned above, a simulator which is called so-called HILS (Hardware In the Loop Simulation) and simulates responses equal with a real engine is used on behalf of each controlled plant such as the real engine (see Reference 1, for example).

In a conventional technique, the HILS has been provided for each controlled plant, and the evaluation of the ECU has been performed for each controlled plant based on a signal acquired from the HILS.

[Reference 1] Japanese Unexamined Patent Publication No. 2004-361292

DISCLOSURE OF THE INVENTION

Problems to be Solved by the Invention

By the way, in recent vehicle control, the ECUs controlling controlled plants (i.e., controlled objects) such as the engine, the power steering, the brake, and the torque converter are connected with each other via a network, and so-called cooperative control that controls each controlled plant while exchanging information between the ECU is performed.

For example, in the cooperative control, when the wheels of a vehicle slip on a snow road, the ECU for the brake controls a braking force to prevent the wheels from slipping, and at the same time the ECU for the engine controls an engine torque to more securely prevent the vehicle from slipping. In the cooperative control, the plurality of ECUs cooperate mutually to integratedly control the vehicle.

To evaluate operations of the plurality of ECUs connected to each other via the network, it is considered that the HILS is provided for each ECU and simulation is performed while the HILSs are synchronizing with each other.

However, to perform the simulation while the HILSs are synchronizing with each other, it is necessary to obtain real ECUs. However, the real ECUs are often in design or development phases, and hence it may be difficult to obtain desired real ECUs. It takes man-hours very much to make plant models of the controlled plants in all HILSs.

The present invention has been made in view of the above circumstances and provides a simulation apparatus that is used for design or development of a controller, and capable of performing simulation which reflects a control operation of other real controller even when the other real controller except for a real controller as a test object does not exist.

Also, the present invention provides a model for simulation and an apparatus forming the model for simulation that can efficiently form a larger-scale integrated plant model used by the simulation apparatus.

Means for Solving the Problems

A simulation apparatus as an aspect of the present invention, comprising: a model process portion that executes an arithmetic process of a model relating to a controlled object that a real controller controls; a controller simulation portion that simulates another controller executing given control while communicating with the real controller; and a management portion that manages the execution of an input and output process to the real controller by an input and output process portion, a process by the model process portion, and a process by the controller simulation portion; wherein the management portion causes the input and output process portion, the model process portion, and the controller simulation portion to execute the processes required for the operation of the real controller during a given period on the basis of the operation of the real controller.

With the above composition, the controller simulation portion is substituted for the another controller communicating with the real controller, and the management portion causes the controller simulation portion to operate in conformity with the real operation of the real controller. Therefore, even if all the real controllers do not necessarily exist, it is capable of executing the same simulation as in the case where all the real controllers are used.

In the above composition, the management portion may cause the input and output process portion, the model process portion, and the controller simulation portion to execute the processes required for the operation of the real controller during the given period, and when the processes required for the operation of the real controller are completed, the management portion may cause the input and output process portion, the model process portion, and the controller simulation portion to wait for the execution of the processes until the next given period.

In the above composition, the process by the model process portion and the process by the controller simulation portion may be executed with arithmetic devices in parallel.

In the above composition, the model in which the model process portion executes the arithmetic process may be formed by implementing a model required depending on the real controller on a platform that composes a basic frame of the processed model.

In the above composition, the model in which the model process portion executes the arithmetic process may be formed by implementing a model for each element on a platform that is configured so as to divide a single function of a modeled controlled object into a plurality of elements.

In the above composition, the model in which the model process portion executes the arithmetic process may be formed by implementing a plurality of models on the platform, and when the plurality of models are implemented on the platform, detail levels of the respective models may be selected depending on the control contents executed by the real controller.

In the above composition, the model in which the model process portion executes the arithmetic process may be a model for a vehicle, and the platform may be configured so as to divide at least one function of a power supply layer prescribing a power supply system, a torque layer prescribing a driving system, a diagnosis layer prescribing a failure diagnosis system, and a communication layer prescribing a communication system into the plurality of elements.

In the above composition, the platform of the model in which the model process portion executes the arithmetic process may be configured so as to provide a plurality of layers for each modeled controlled object.

A model for simulation according to another aspect of the present invention is a model for simulation that models a simulated object to execute the simulation, wherein the model for simulation is formed by implementing a model required depending on a real controller as the simulated object on a platform that composes a basic frame of the model for simulation.

An apparatus forming a model for simulation according to the other aspect of the present invention is an apparatus forming a model for simulation that models a simulated object to execute the simulation, wherein the apparatus forms a desired model for simulation by implementing a model required depending on a real controller as the simulated object on a platform that composes a basic frame of the model for simulation.

Effects of the Invention

According to the present invention, it is capable of performing simulation which reflects a control operation of other real controller even when the other real controller except for a real controller as a test object does not exist.

In addition, according to the present invention, it is capable of efficiently forming an integrated model for simulating a larger-scale integrated plant.

BRIEF DESCRIPTION OF THE DRAWINGS

FIG. 7 is a diagram useful in explaining the timing chart in FIG. 6.

BEST MODES FOR CARRYING OUT THE INVENTION

A description will now be given of preferred embodiments of the present invention with reference to the accompanying drawings.

Figure 1:
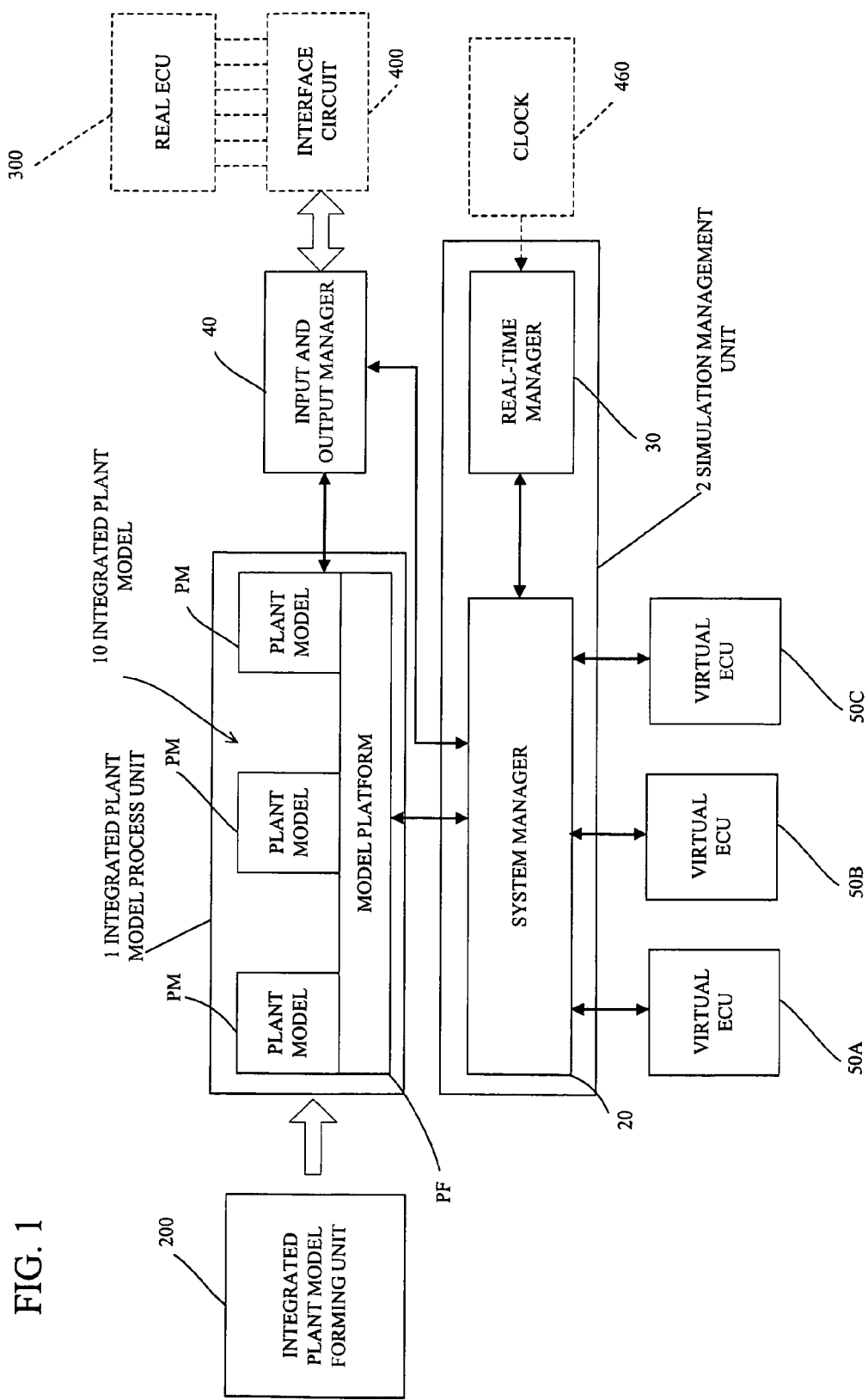
FIG. 1 is a functional block diagram of a simulation apparatus according to an embodiment of the present invention.
Figure 2:
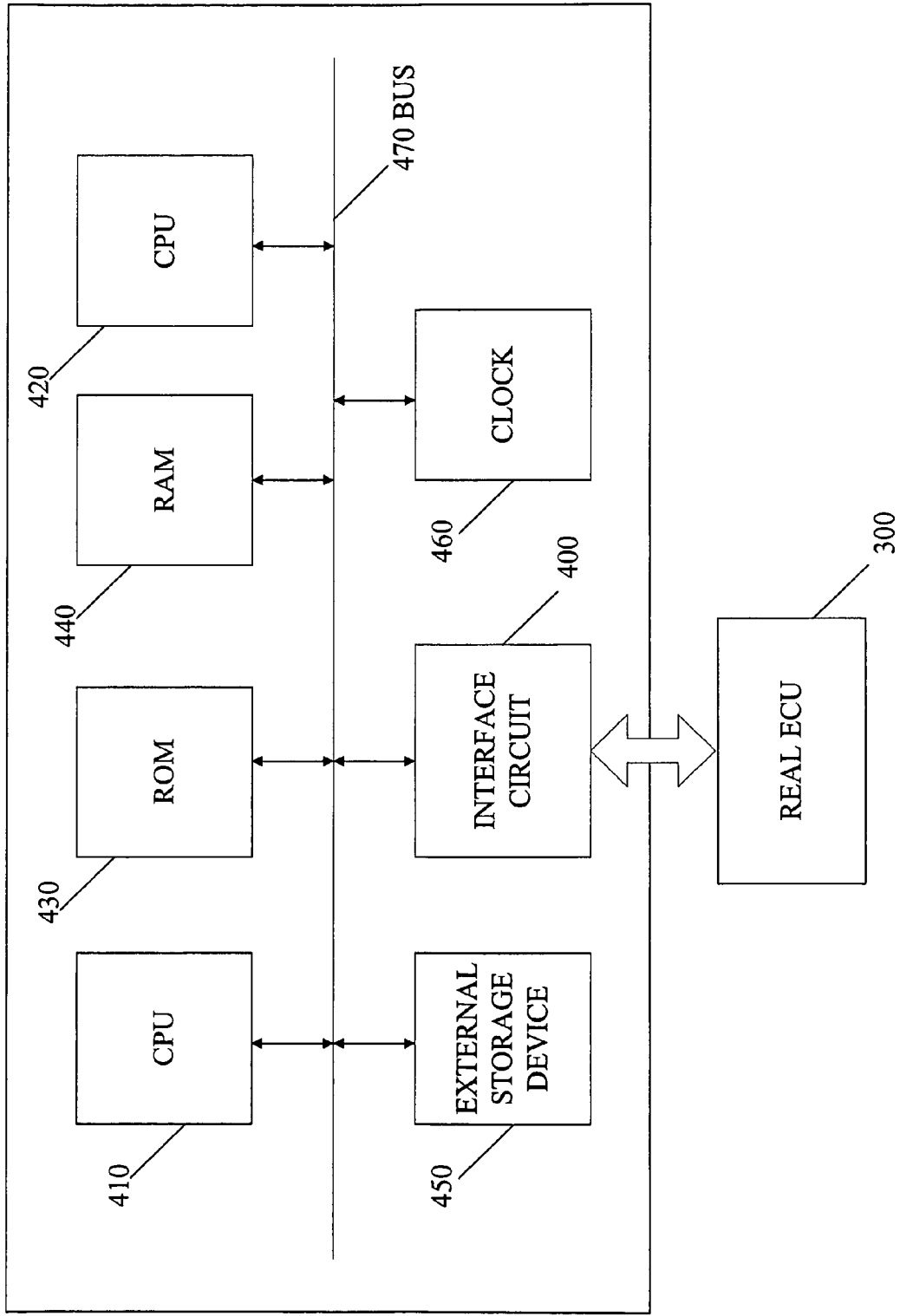
FIG. 2 is a diagram showing the hardware construction of the simulation apparatus.

FIGS. 1 and 2 show a simulation apparatus according to an embodiment of the present invention. FIG. 1 is a functional block diagram of the simulation apparatus according to the embodiment of the present invention, and FIG. 2 is a diagram showing the hardware construction of the simulation apparatus.

The simulation apparatus is composed of an integrated plant model process unit 1 as a model process portion, a simulation management unit 2 as a management portion, an input and output manager 40, virtual ECUs 50A to 50C as controller simulation portions, an integrated plant model forming unit 200, an interface circuit 400, a clock circuit 460, and so on.

The integrated plant model process unit 1 includes an integrated plant model 10 as a model for simulation.

The simulation management unit 2 includes a system manager 20 and a real-time manager 30.

As shown in FIG. 2, the hardware of the simulation apparatus is composed of the above-mentioned interface circuit 400, a plurality of CPUs (Central Processing Unit) 410 and 420 as arithmetic devices, a ROM (Read Only Memory) 430 storing required programs, a RAM (Random Access Memory) 440 storing programs and various data to be performed, an external storage device 450 such as, for example, a hard disk drive, the clock circuit 460 supplying a reference clock of a given frequency, a bus 470 connecting these elements to each other, and so on.

It should be noted that the integrated plant model 10, the system manager 20, the real-time manager 30, the input and output manager 40, the virtual ECUs 50A to 50C, the integrated plant model forming unit 200, and so on are realized by the hardware and the required software.

The interface circuit 400 includes a lot of connection terminals, and the connection terminals are electrically connected to input and output terminals of a real ECU 300, respectively.

The real ECU 300 is composed of, for example, an ECU for engine control of the vehicle. The real ECU 300 includes a processor, a memory, an input and output circuit, and so on (not shown), and exchanges various input/output signals (I/O signals) with the simulation apparatus via the interface circuit 400.

The plurality of CPUs 410 and 420 are provided in order to disperse software processes in the simulation apparatus. For example, the CPUs 410 and 420 share a process of the integrated plant model 10 that is relatively a large process load, and processes of the virtual ECUs 50A to 50C, respectively. It should be noted that the number of CPUs is not limited to this, and the CPU may be provided for each process of the virtual ECUs 50A to 50C.

The system manager 20 manages comprehensively the software processes in the simulation apparatus, and includes a function that collects each event generated in the simulation apparatus, a function that manages and sets time to be activated for each collected event, a function that starts up the integrated plant model 10, the virtual ECUs 50A to 50C, and the input and output manager 40 in the order of the set time for each collected event, and operates the integrated plant model 10, the virtual ECUs 50A to 50C, and the input and output manager 40, and so on.

The real-time manager 30 monitors whether processes relating to the integrated plant model 10, the virtual ECUs 50A to 50C, and the input and output manager 40 managed by the system manager 20 are completed during a given real-time period (e.g. 1 ms). That is, the real-time manager 30 manages the software processes in the simulation apparatus based on the real-time period, in conformity with the operation of the real ECU 300.

The input and output manager 40 is started up by the system manager 20, and performs an input and output process of signals transmitted to or received from the real ECU 300 via the interface circuit 400.

The virtual ECUs 50A to 50C simulate control of at least one of controlled plants composing the integrated plant model 10, and communication control with the real ECU. For example, the virtual ECUs 50A to 50C simulate the ECUs controlling various controlled plants (i.e. objects controlled by the ECUs) such as a brake, a power train and an automatic transmission of the vehicle. In fact, each ECU realizing each of the virtual ECUs 50A to 50C is communicatable and connected with the real ECU 300 via a network such as CAN (Controller Area Network), and performs so-called cooperative control which controls each of the controlled plants while exchanging information between the ECUs.

The integrated plant model process unit 1 incorporates the integrated plant model 10 which has integrated plant models PMs of the plurality of plants controlled by the real ECU 300 and the virtual ECUs 50A to 50C, and performs an arithmetic process of the integrated plant model 10. The integrated plant model 10 indicates a larger-scale plant mode formed by integrating the plurality of plants controlled by the respective ECUs. The integrated plant model process unit 1 starts up and operates by the system manager 20.

The integrated plant model forming unit 200 is software to form the integrated plant model 10.

Here, a description will be given of a software environment to form the integrated plant model 10 with reference to FIG. 3.

Figure 3:
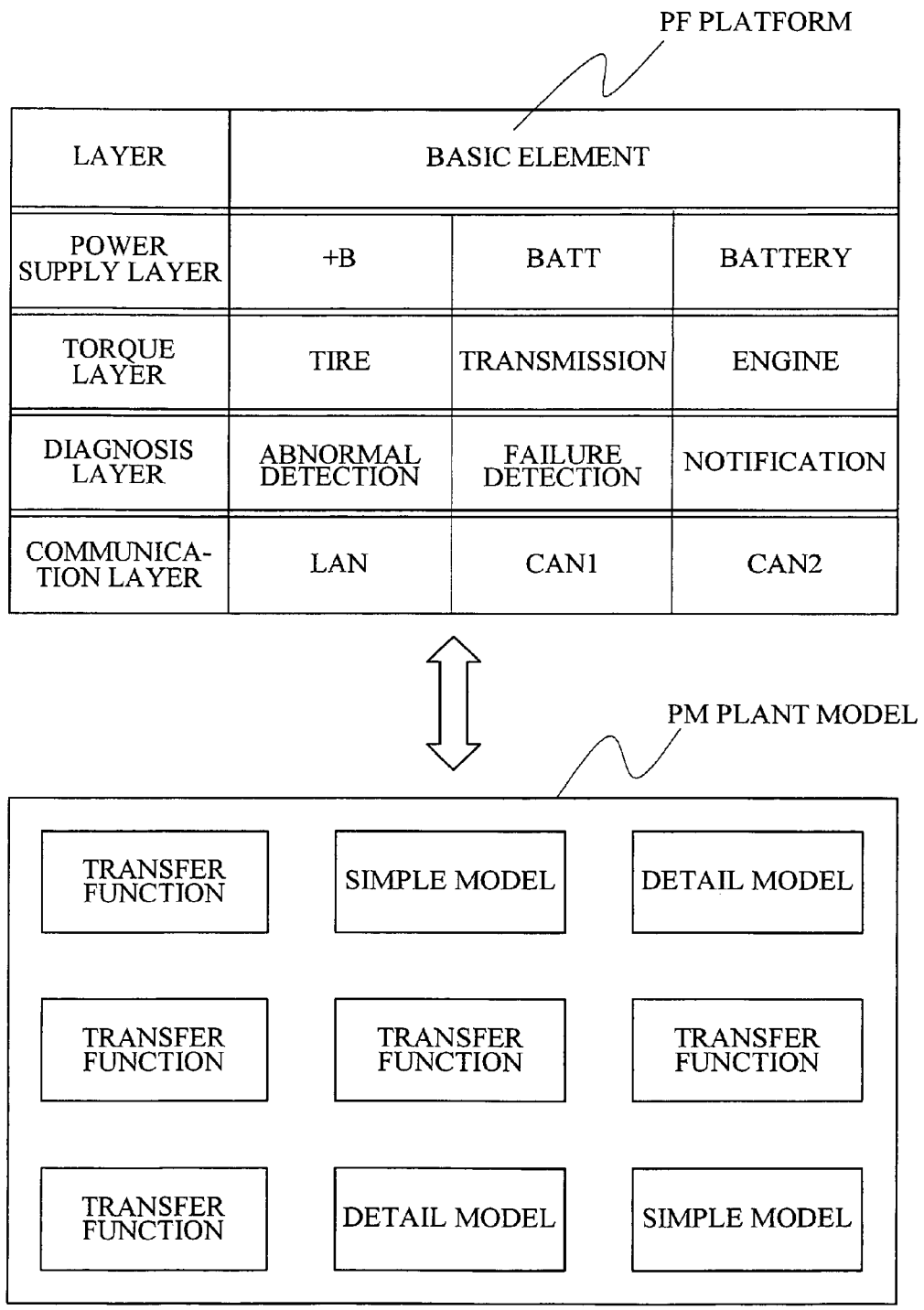
FIG. 3 is a diagram useful in explaining a software environment for forming an integrated plant model.

The integrated plant model 10 is formed based on a platform PF as shown in FIG. 3, for example. The platform PF composes a basic frame of the integrated plant model 10, and is hierarchized to, for example, a power supply layer prescribing a power supply system, a torque layer prescribing a driving system, a diagnosis layer prescribing a failure diagnosis system, a communication layer prescribing a communication system such as the CAN, and so on, for each function equipped in the vehicle. Further, each layer is divided into a plurality of basic elements to achieve functions of the corresponding layer.

To form the integrated plant model 10, various plant models PMs are prepared as shown in FIG. 3. The various plant models PMs are implemented on corresponding basic elements of the platform PF. The plant models PM can be selected depending on the construction of the real ECU 300 and the virtual ECUs 50A to 50C. Detail models can be used for parts that wants to be simulated in detail, and simplified simple models and transfer functions can be used for other parts except for the above part.

When a user wants to simulate the driving system in detail, the detail models are implemented on the basic elements such as a tire, a transmission, and an engine of the torque layer in the platform PF, and the plant models PMs composed of the simple models and the transfer functions are implemented on the basic elements of the other power supply layer, the diagnosis layer, the communication layer, and so on.

By implementing necessary plant models PMs on the platform PF, the integrated plant model 10 that has organically coupled between the necessary plant models PMs is formed.

When a large-scale model such as a vehicle model is built, if all the plant models PMs are composed of the detail models, a process load necessary for performing an arithmetical operation of the large-scale model becomes enormous. Therefore, there is a possibility of causing a failure in the process when it is necessary to perform the arithmetical operation of the large-scale model in real time.

Accordingly, when the simulation is performed, a model having an appropriate detail level may be selected as each element composing the large-scale model so that respective detail levels of models as elements composing the large-scale model become appropriate depending on how much detail level is necessary (i.e., how level is a related level between the real ECU 300 which is an evaluation object and data arithmetically operated by each model, how level is a related level between evaluation contents that the user wants to evaluate and data arithmetically operated by each model, and so on).

For example, when the user wants to evaluate the engine ECU, it is considered to lower the detail level of a transmission model more than that of an engine model, and to further lower the detail level of a tire model more than that of the transmission model, and so on.

When the same simulation object (e.g. the vehicle) is simulated, if the construction of the large-scale model such as the vehicle model as described above changes depending the contents of the simulations (i.e., the detail levels of the models composing respective elements included in the large-scale models differ from each other), the large-scale model has to be remade every time the contents of the simulation change, whereby the efficiency to form the large-scale model decreases. However, if the models are implemented on the model platform depending on the contents of the simulation, as shown in FIG. 3, the efficiency to form the large-scale model improves greatly.

The integrated plant model forming unit 200 may be configured so as to automatically form the large-scale model based on the above-mentioned method.

For example, when there is provided a map which has stored a related level between control contents of the real ECU 300 and evaluation contents evaluating the real ECU 300, and each function (layer) and each element in the model platform, and the user inputs the control contents and the evaluation contents of the real ECU 300, the models of the appropriate detail levels may be automatically selected and implemented to each function (layer) and each element of the model platform, depending on the related level stored into the map.

Thus, the platform PF for forming the integrated plant model 10 is previously prepared, so that the large-scale model can be efficiently formed.

Figure 4:
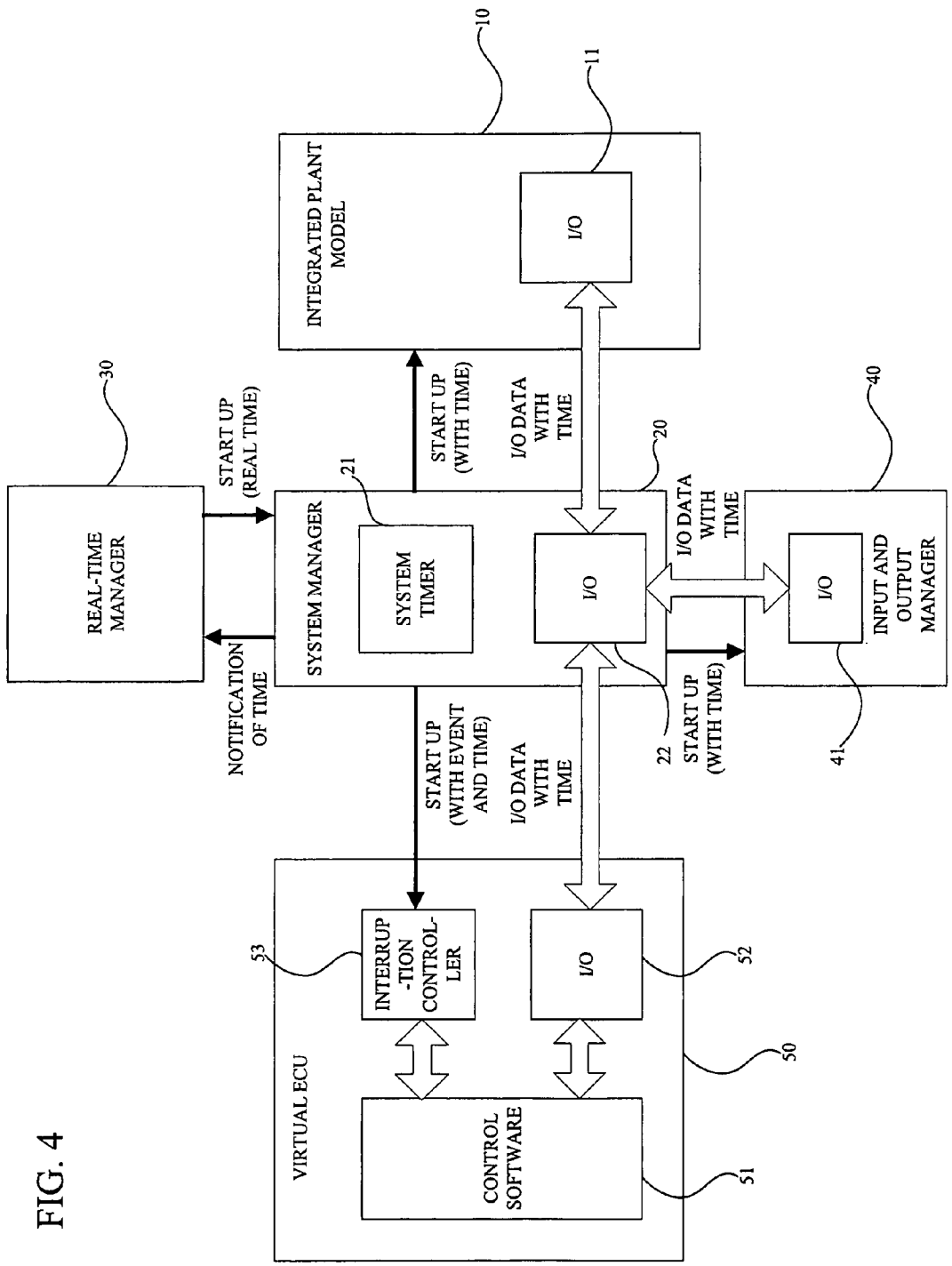
FIG. 4 is a diagram showing the software construction in the simulation apparatus.

Here, a description will be further given of a relationship between the integrated plant model 10, the system manager 20, the real-time manager 30, the input and output manager 40, and the virtual ECU 50 (50A to 50C) in detail with reference to FIG. 4.

As shown in FIG. 4, the system manager 20 includes a system timer 21, and the system timer 21 sets a start-up time for each event generated in a software operation environment. The set time becomes a reference time in the entire software operation environment of the simulation apparatus, and the integrated plant model 10, the input and output manager 40, and the virtual ECU 50 (50A to 50C) operate in common timing on the same virtual time.

As shown in FIG. 4, I/O data with the time set by the system manager 20 is input and output between an I/O unit 22 in the system manager 20, and I/O units 11, 41 and 52 in the integrated plant model 10, the input and output manager 40, and the virtual ECU 50. That is, the system manager 20 manages the input and output of the integrated plant model 10, the input and output manager 40, and the virtual ECU 50 on the virtual time.

When the system manager 20 causes the virtual ECU 50 to start up various interruption processes, the system manager 20 provides an event with the time set by itself for an interruption controller 53 of the virtual ECU 50. Thereby, an interruption process routine corresponding to an event in control software 51 of the virtual ECU 50 is performed. The system manager 20 also manages the interruption process of the virtual ECU 50 on the virtual time.

Also, when the system manager 20 starts up the integrated plant model 10, the system manager 20 provides a start-up signal with the time for the integrated plant model 10, and manages a process of the integrated plant model 10 on the virtual time.

In addition, when the system manager 20 starts up the input and output manager 40, the system manager 20 provides a start-up signal with the time for the input and output manager 40, and manages an input and output process of the input and output manager 40 on the virtual time.

The real-time manager 30 starts up the system manager 20 at real time in conformity with the operation of the real ECU 300, as shown in FIG. 4, and receives notification of time when the processes of the system manager 20 are completed, whereby the real-time manager 30 manages the system manager 20 so that the processes of the integrated plant model 10, the input and output manager 40, and the virtual ECU 50 which are managed by the system manager 20 are performed during a given period on the basis of the operation of the real ECU 300.

Next, a description will be given of the processes of the simulation apparatus having the above-mentioned construction with reference to FIGS. 5 to 7.

Figure 5:
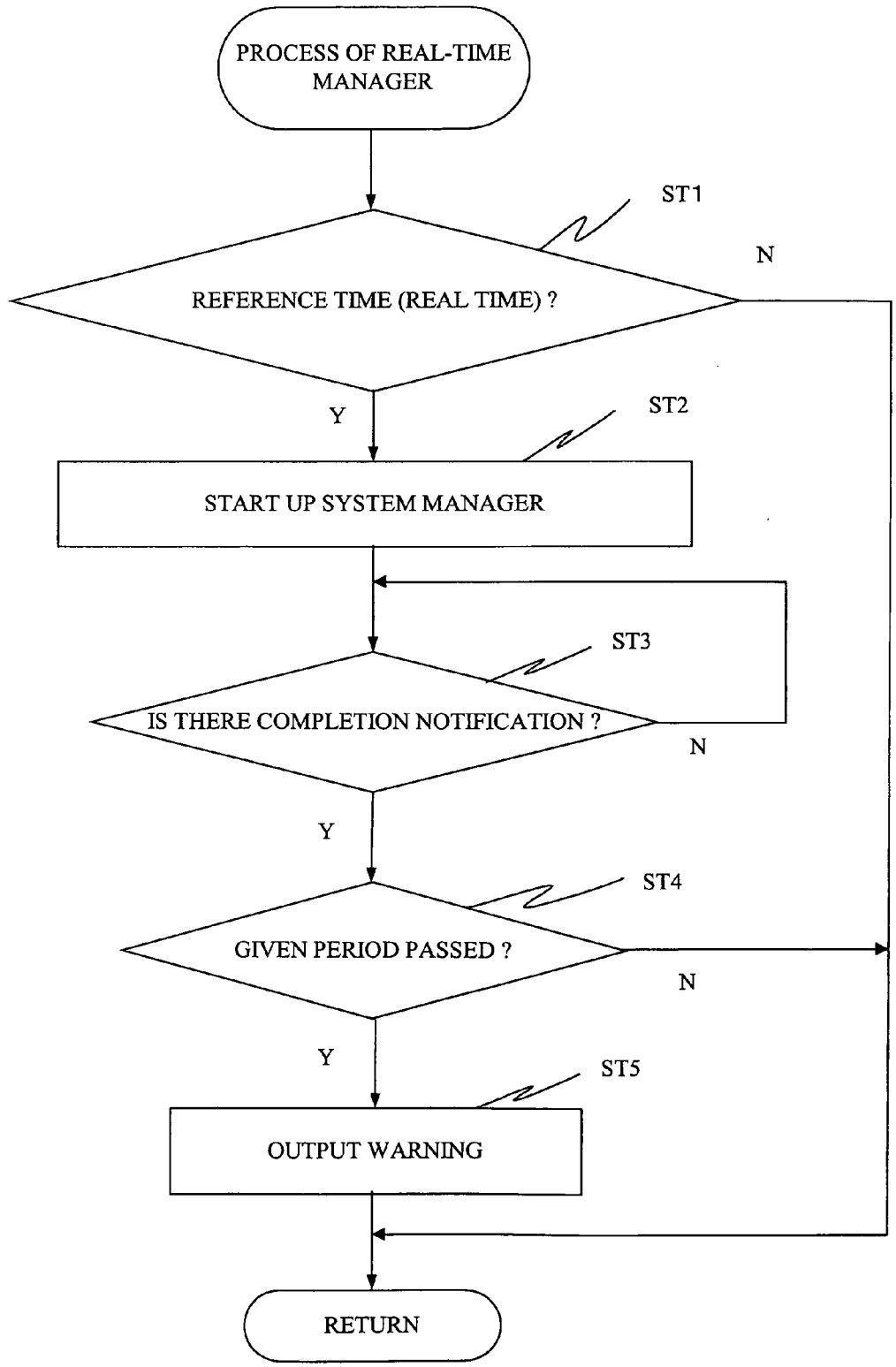
FIG. 5 is a flowchart showing an example of a process performed by a real-time manager.
Figure 6:
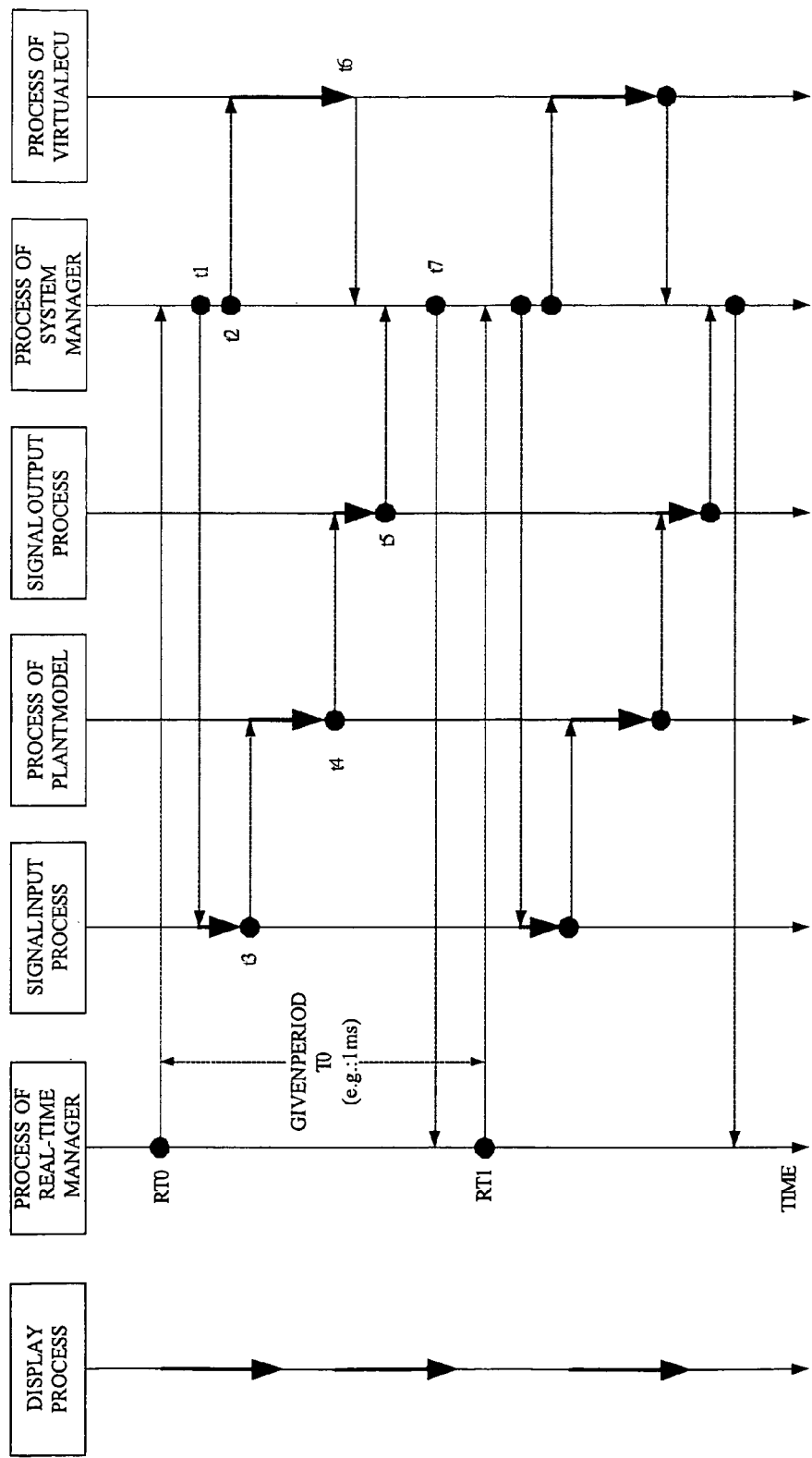
FIG. 6 is a timing chart showing timing at which each software process is performed.

FIG. 5 is a flowchart showing an example of a process performed by the real-time manager, FIG. 6 is a timing chart showing timing at which each software process is performed, and FIG. 7 is a diagram useful in explaining the timing chart in FIG. 6.

The processes of the simulation apparatus includes, for example, a process of the integrated plant model process unit 1, a process of the system manager 20, a process of the real-time manager 30, a signal input process and a signal output process of the input and output manager 40, processes of the virtual ECUs 50A to 50C, and a display process displaying various information such as control information and simulation information of the real ECU 300 on a display device, not shown, as shown in FIG. 6. In these processes, the process of the integrated plant model process unit 1, the process of the system manager 20, the process of the real-time manager 30, the signal input process and the signal output process of the input and output manager 40, and the processes of the virtual ECUs 50A to 50C need synchronization with the real ECU 300. In the simulation apparatus, the display process or the like is executed without being synchronized with the real ECU 300.

As shown in FIG. 5, the real-time manager 30 determines whether the current time is the reference time of the real ECU 300 side (step ST1). When the current time is the reference time, the real-time manager 30 starts up the system manager 20 (step ST2).

After the system manager 20 is started up, the real-time manager 30 waits until the system manager 20 receives completion notification relating to the process of the system manager 20 from the system manager 20 (step ST3), and determines whether the time in which the completion notification has been received does not pass a given period (e.g. 1 ms) prescribed by the real ECU 300 side (step ST4). When the process of the system manager 20 is not completed during the given period, the real-time manager 30 outputs a warning (step ST5).

When the system manager 20 is started by the real-time manager 30 in reference time RT0 of the real ECU 300 side, as shown in FIGS. 5 and 6, for example, the system manager 20 starts up the input and output manager 40 in time t1 managed on the software, and the virtual ECUs 50A to 50C in time t2.

When the input and output manager 40 is started up, the input and output manager 40 acquires an input signal of the real ECU 300 via the interface circuit 400, and inputs the input signal to the integrated plant model 10 by time t3.

The integrated plant model 10 outputs a process result on the basis of the input signal from the input and output manager 40, to the input and output manager 40 by time t4.

The input and output manager 40 outputs a signal to the real ECU 300 via the interface circuit 400 by time t5.

The processes of the virtual ECUs 50A to 50C are performed by another CPU other than a CPU processing the integrated plant model 10, and in parallel with the process of the integrated plant model 10 until time t6.

Then, the system manager 20 outputs the completion notification relating to the process of the system manager 20 to the real-time manager 30 in time t7. When the time t7 passes a given period T0 from the reference time RT0 to a reference time RT1, the above-mentioned warning is output by the real-time manager 30.

In this case, it is possible to take actions such as the review of the plant models PMs composing the integrated plant model 10, the review of the arithmetic process of the virtual ECUs 50A to 50C, and the addition of a new CPU.

Although in the above-mentioned description, only the input and output process (i.e., the input and output process by the input and output manager) is described about the process relating to an exchange of data, an exchange of data in the simulation apparatus (e.g. an exchange of data between the virtual ECUs 50A to 50C, an exchange of data between the virtual ECUs 50A to 50C and the integrated plant model 10, and so on) is properly performed during the given period T0. In addition to the exchange of data in such a simulation apparatus, in the input and output process to the real ECU 300 as described at t1, a process (t1) changing a value, as an input signal from the real ECU 300, exposed to each unit (e.g. the integrated plant model 10 and the virtual ECUs 50A to 50C) in the simulation apparatus, and a process changing a value of an output signal output to the real ECU 300 (i.e., a process changing a value of the output signal which is output to the real ECU 300 at all times) are performed only once during the given period T0.

Although in the above described embodiment, a model forming apparatus is applied to the simulation apparatus as the integrated plant model forming unit 200, this is not limitative, but the model forming apparatus is also applicable to a simulation apparatus other than the simulation apparatus of the above described embodiment.

Although in the above described embodiment, the simulation apparatus is used for the vehicle, this is not limitative, but the simulation apparatus is applicable for design and development and so on of ECUs in other electronic devices.

Although in the above described embodiment, the management portion is composed of the system manager 20 and the real-time manager 30, this is not limitative, but it is also possible to adopt other software compositions if the functions of the management portion can be achieved.

Although in the above described embodiment, there are provided the plurality of virtual ECUs, there may be provided a single virtual ECU or a number of virtual ECUs more than the above described embodiment.

Although in the above described embodiment, there are provided the single real ECU, it is also possible to apply the present invention to two or more different real ECUs.

The invention claimed is:

1. A simulation hardware apparatus comprising:
a model process portion that executes an arithmetic process of a model relating to a controlled object that a real controller controls;
a controller simulation portion that simulates another controller executing given control while communicating with the real controller; and
a management portion that manages the execution of an input and output process to the real controller, a process by the model process portion, and a process by the controller simulation portion;
wherein the management portion causes the model process portion, and the controller simulation portion to execute the processes required for the operation of the real controller during a given period on the basis of the operation of the real controller, the model for the arithmetic process is formed as a vehicle model by implementing a required model, depending on the real controller, for each of the plurality of elements on a platform that composes a basic frame of the processed model, the plurality of elements are obtained by dividing a single function of a modeled controlled object, and the platform is configured so as to divide at least one function of a power supply layer prescribing a power supply system, a torque layer prescribing a driving system, a diagnosis layer prescribing a failure diagnosis system, and a communication layer prescribing a communication system into the plurality of elements.

2. The simulation hardware apparatus as claimed in claim 1, wherein the management portion causes the input and output process portion, the model process portion, and the controller simulation portion to execute the processes required for the operation of the real controller during the given period, and when the processes required for the operation of the real controller are completed, the management portion causes the input and output process portion, the model process portion, and the controller simulation portion to wait for the execution of the processes until the next given period.

3. The simulation hardware apparatus as claimed in claim 1, wherein the process by the model process portion and the process by the controller simulation portion are executed with arithmetic devices in parallel.

4. The simulation hardware apparatus as claimed in claim 1, wherein the model for the arithmetic process is formed by implementing a plurality of models on the platform, and when the plurality of models are implemented on the platform, detail levels of the respective models are selected depending on the control contents executed by the real controller.

* * * * *

UNITED STATES PATENT AND TRADEMARK OFFICE
CERTIFICATE OF CORRECTION

PATENT NO. : 8,036,761 B2
APPLICATION NO. : 12/311212
DATED : October 11, 2011
INVENTOR(S) : Takashi Higuchi et al.

It is certified that error appears in the above-identified patent and that said Letters Patent is hereby corrected as shown below:

Title Page;

Please delete the following:

(75) Inventors: Takashi Higuchi, Kobe (JP); Hirotoshi Tonou, Kobe (JP); Takeshi Yamazaki, Kobe (JP); Yu Moriyama, Kobe (JP)

And replace with:

(75) Inventors: Takashi Higuchi, Kobe (JP); Hirotoshi Tonou, Kobe (JP); Takeshi Yamasaki, Kobe (JP); Yu Moriyama, Kobe (JP)

Signed and Sealed this
Thirteenth Day of December, 2011

David J. Kappos
*Director of the United States Patent and Trademark Office*